US008533814B2

(12) United States Patent
Neely

(10) Patent No.: US 8,533,814 B2

(45) Date of Patent: Sep. 10, 2013

(54) NETWORKED PHYSICAL SECURITY ACCESS CONTROL SYSTEM AND METHOD

(75) Inventor: E. Terry Neely, Reston, VA (US)

(73) Assignee: Redcloud Security Inc., Sterling, VA (US)

( * ) Notice: Subject to any disclaimer, the term of this patent is extended or adjusted under 35 U.S.C. 154(b) by 0 days.

(21) Appl. No.: 13/350,112

(22) Filed: Jan. 13, 2012

(65) Prior Publication Data

US 2012/0174182 A1 Jul. 5, 2012

Related U.S. Application Data

(62) Division of application No. 11/852,612, filed on Sep. 10, 2007, now Pat. No. 8,122,497.

(51) Int. Cl.
*G06F 13/00* (2006.01)

(52) U.S. Cl.
USPC .......................... 726/18; 726/1; 726/2; 726/5

(58) Field of Classification Search
USPC ........................................................... 726/1
See application file for complete search history.

(56) References Cited

U.S. PATENT DOCUMENTS

| | | | | |
|---|---|---|---|---|
| 4,839,640 | A | 6/1989 | Ozer et al. | |
| 5,263,158 | A | 11/1993 | Janis | |
| 6,233,588 | B1 | 5/2001 | Marchoili et al. | |
| 6,738,772 | B2 | 5/2004 | Regelski et al. | |
| 7,069,437 | B2 * | 6/2006 | Williams | 713/166 |
| 8,122,497 | B2 * | 2/2012 | Neely | 726/18 |
| 2003/0105812 | A1 * | 6/2003 | Flowers et al. | 709/203 |
| 2006/0293892 | A1 * | 12/2006 | Pathuel | 704/246 |
| 2008/0046984 | A1 * | 2/2008 | Bohmer et al. | 726/5 |
| 2008/0209505 | A1 | 8/2008 | Ghai et al. | |
| 2008/0271109 | A1 | 10/2008 | Singh et al. | |

OTHER PUBLICATIONS

Harrington, et al. "Cryptographic Access Control in a Distributed File System," Jun. 2-3, 2003, pp. 158-165, ACM.

Keromytis et al., "Requirements for Scalable Access Control and Security Management Architectures," May 2007, pp. 1-22, ACM.

S2 NetBox by S2 Security Corporation, Wellesley, Massachusetts, Feb. 7, 2006.

Brivo ACS Onsite Brivo Systems, Bethesda, Maryland , Nov. 10, 2006.

* cited by examiner

*Primary Examiner* — Matthew Smithers

(74) *Attorney, Agent, or Firm* — Dickinson Wright PLLC

(57) ABSTRACT

A distributed networked physical security access control system for controlling a plurality of security access devices includes access server appliances in communication with a primary network. At least one access server appliance includes an appliance management module accessible through a web browser in communication with the primary network. The appliance management module configures the access server appliances to a user specified security configuration. The access server appliances are in peer-to-peer communication on the primary network to bridge the access server appliances for providing consistency in each of the access server appliances.

11 Claims, 3 Drawing Sheets

NETWORKED PHYSICAL SECURITY ACCESS CONTROL SYSTEM AND METHOD

CROSS REFERENCE TO RELATED APPLICATIONS

The present application is a divisional of U.S. application Ser. No. 11/852,612 filed Sep. 10, 2007. The entire disclosure of U.S. application Ser. No. 11/852,612 is considered part of the disclosure of this application and is hereby incorporated by reference.

BACKGROUND OF THE INVENTION

1. Field of the Invention

The subject invention relates generally to a networked physical security access control system and a method of implementing the same, and, more specifically to a distributed networked physical security access control system and method of implementing the same.

2. Description of the Prior Art

Security access control systems limit access, for example to buildings, areas, mantraps, and doors using credential readers and electric locking mechanisms in conjunction with policies and credentials stored in a central repository. When a credential is presented to the reader, the system grants or denies access based on current policies and the validity and authorization of the credential. Manufacturers deploy these products on a variety of computer servers and workstations. Due to the increased sophistication of these systems over the years, their proprietary nature and wide range of variables including servers, operating system software, and networking, the systems require highly trained and experienced technicians to install, deploy, and maintain.

In addition, many companies have through acquisitions or organic growth increased the number of physical facilities requiring a method to share information with other facilities without requiring constant communication with any one server. Distributed systems require higher levels of software integration and network support previously not required in a traditional single server based deployment increasing training and ongoing support costs. An example of such a distributed security access control system is disclosed in U.S. Pat. No. 6,233,588 to Marchoili et al.

The Marchoili et al. patent discloses a security access control system including a master database and a plurality of regional databases each disclosed in a different region. The master database is in communication with each of the regional databases. Each regional database periodically uploads to the master database any changes in the access control information of the regional database, and the master database periodically downloads from the master database to each regional database any changes in the access control information made by other regions. The master database is maintained identical to the regional databases.

In a system such as that disclosed by the Marchoili et al. patent, the master database is continuously uploading and downloading any changes in access control information. This can be a very costly process in such a large system. Further, the physical security system and its increasing reliance on organization's information technology infrastructure have caused information technology departments to look for ways to reduce time to deploy these systems, minimize impact on information technology resources, and reduce maintenance costs. This requires standard methods for these systems to be deployed and maintained by an organization's information technology department. Also, as information technology deploys network security systems, the opportunity to integrate physical security into these commercial off the shelf products using open standard methods provides additional methods to reduce maintenance costs. An example of such a system is Brivo's econtrol Online Access Control System.

Brivo's system discloses a networked physical security access control system for controlling a security access device comprising a primary network including a user interface being a web browser. A centrally located access server appliance is disposed in communication with the primary network. The access server appliance includes an appliance management module for configuring the access server appliance to a user specified security configuration. The access server appliance provides security to a plurality of remote sites. A method for implementing a networked physical security access control system such as that disclosed by Brivo generally includes the steps of mounting an access server appliance including an appliance management module into a computer system, communicating the access server appliance with a primary network including a user interface, and configuring the appliance management module to a user specified security configuration.

While the Brivo system provides a web-hosted networked physical security access control system, it still relies on a single, central host access server appliance to provide a user specified security configuration to multiple remote sites. There remains the need for a more effective and cost efficient distributed networked physical security access control system.

SUMMARY OF THE INVENTION AND ADVANTAGES

The present invention provides a networked physical security access control system improved by including a plurality of access server appliances in communication with a primary network with the access server appliances being in peer-to-peer communication on the primary network to bridge the access server appliances for providing consistency in each of the access server appliances.

The invention also provides an improved method of implementing a networked physical security access control system by communicating a plurality of access server appliances with the primary network and replicating the appliance management module of an accessed access server appliance in each of the other access server appliances through peer-to-peer communication on the primary network to maintain consistency in the access server appliances in response to configuring the appliance management module of the accessed access server appliance to a user specified security configuration.

The invention provides a distributed networked physical security access control system and a method of implementing the same while leveraging the existing information technology infrastructure and eliminating the requirement of any server or client software to be installed on any computer system. The system communicates with access controllers which in turn communicate with the security access devices.

The invention maintains a user specified security configuration redundantly across all access server appliances using peer-to-peer communication to maintain consistency and high availability without requiring connectivity to a central server. In addition, the invention maintains event and transaction logs redundantly across all access server appliances. The minoring of data supports high availability and high performance by dividing the workload across multiple access server appliances. Events and transactions may also be sent to other systems for processing, review and corrective action.

The invention also provides for a distributed credential database and a distributed policy database across all access server appliances providing multiple locations the ability to access, control, and monitor buildings, areas, and doors without requiring connectivity to a central server. The distributed databases use peer-to-peer communication and directory services to maintain consistency and high availability using industry standard technology.

The invention provides the ability to add, modify, and remove access control policies that govern decision making, reporting, input operations, output operations, and administrative tasks. All modifications are replicated to all other access server appliances to maintain the most up to date policies across the entire system.

The invention serves as a network router and firewall to access controllers and associated hardware preventing attackers from gaining access to devices directly attached to physical assets.

The invention provides a switchover capability such that should a primary access appliance fail, its network interfaces automatically switch to a backup appliance which will continue to operate the security access devices.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
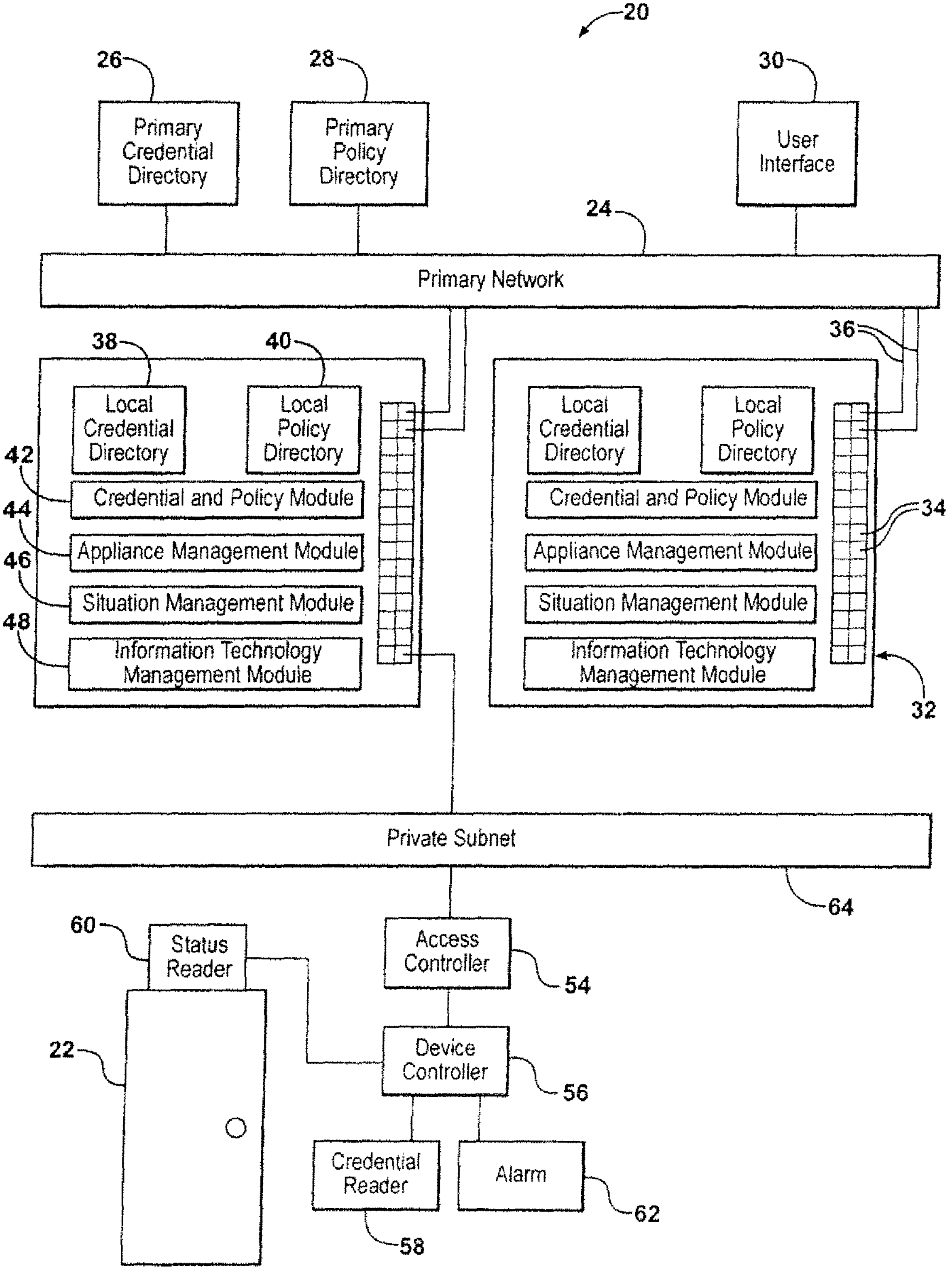
FIG. 1 is a schematic of a networked physical security access control system.

Referring to the Figures, wherein like numerals indicate corresponding parts throughout the several views, a networked physical security access control system 20 for controlling a security access device 22 is shown generally in FIG. 1. In FIG. 1, the security access device 22 is shown as a door, however, those skilled in the art understand that in additional embodiments of the networked physical security access control system 20 the security access device 22 includes any access device commonly known in the art.

The system 20 includes a primary network 24 including a primary credential directory 26 and a primary policy directory 28. The primary network 24 can be a corporate network, a remote network, a wide area network such as the Internet, or any type of network commonly known in the art. The primary network 24 includes a user interface 30 generally being a web browser such as, but not limited to, Internet Explorer or Firefox.

The system 20 includes a plurality of access server appliances 32. The access server appliances 32 are generally 1U rackmount computer systems. Each access server appliance 32 generally handles from one to fifteen hundred security access devices 22 depending on the processing load and response required at the location. Each access server appliance 32 includes a plurality of network interfaces 34. The network interfaces 34 are generally one gigabyte Ethernet interfaces.

In an embodiment of the system 20, a plurality of pairs of network connections 36 enables each access server appliance 32 to communicate with the primary network 24. Each pair of network connections 36 is generally in communication with a pair of the network interfaces 34 of one of the access server appliances 32 and the primary network 24 to define a primary connection and a backup connection between each of the access server appliances 32 and the primary network 24. In such an embodiment, the system 20 provides two connections between each access server appliance 32 and the primary network 24 in case one of the network connections 36 should fail. In an alternative embodiment of the system 20, a single network connection 36 is provided between each access server appliance 32 and the primary network 24.

Each access server appliance 32 includes a local credential directory 38 for storing access control information and a local policy directory 40 for storing security access policies. At least one of the access server appliances 32 accesses the primary credential directory 26 on the primary network 24 and imports and stores the information in its local credential directory 38. At least one of the access server appliances 32 also accesses the primary policy directory 28 on the primary network 24 and imports and stores the information in its local policy directory 40.

Each access server appliance 32 includes a credential and policy module 42 for synchronizing its local credential directory 38 with the primary credential directory 26 and for synchronizing its local policy directory 40 with the primary policy directory 28. In the preferred embodiment, the local credential directory 38 and the local policy directory 40 are lightweight directory access protocol directories. This allows the local credential directory 38 and the local policy directory 40 to replicate using standard information technology tools and applications.

Each access server appliance 32 also includes an appliance management module 44, a situation management module 46, and an information technology management module 48. The appliance management module 44 configures the access server appliance 32 to a user specified security configuration and configures the access server appliance 32 to manage the credential and policy module 42. The situation management module 46 configures a third party physical security situation management system to control the security access equipment. The information technology management module 48 generally monitors the access server appliances 32 and the system 20.

The access server appliances 32 are in peer-to-peer communication on the primary network 24 to bridge the access server appliances 32 for providing consistency in each of the access server appliances 32. Each access server appliance 32 communicates with the other access server appliances 32 using the primary network 24. This communication may include, but is not limited to, the exchange of the following types of data: credential information not obtained from the credential and policy module 42; access control policies including time schedules, permissions, and access levels; complete listings of all the security access devices 22, input points, output points; transactions by the system 20; and control information relating to the operation of the access server appliances 32. All communications between the access server appliances 32 preferably use secure sockets layer to encrypt all information transmitted.

Figure 2:
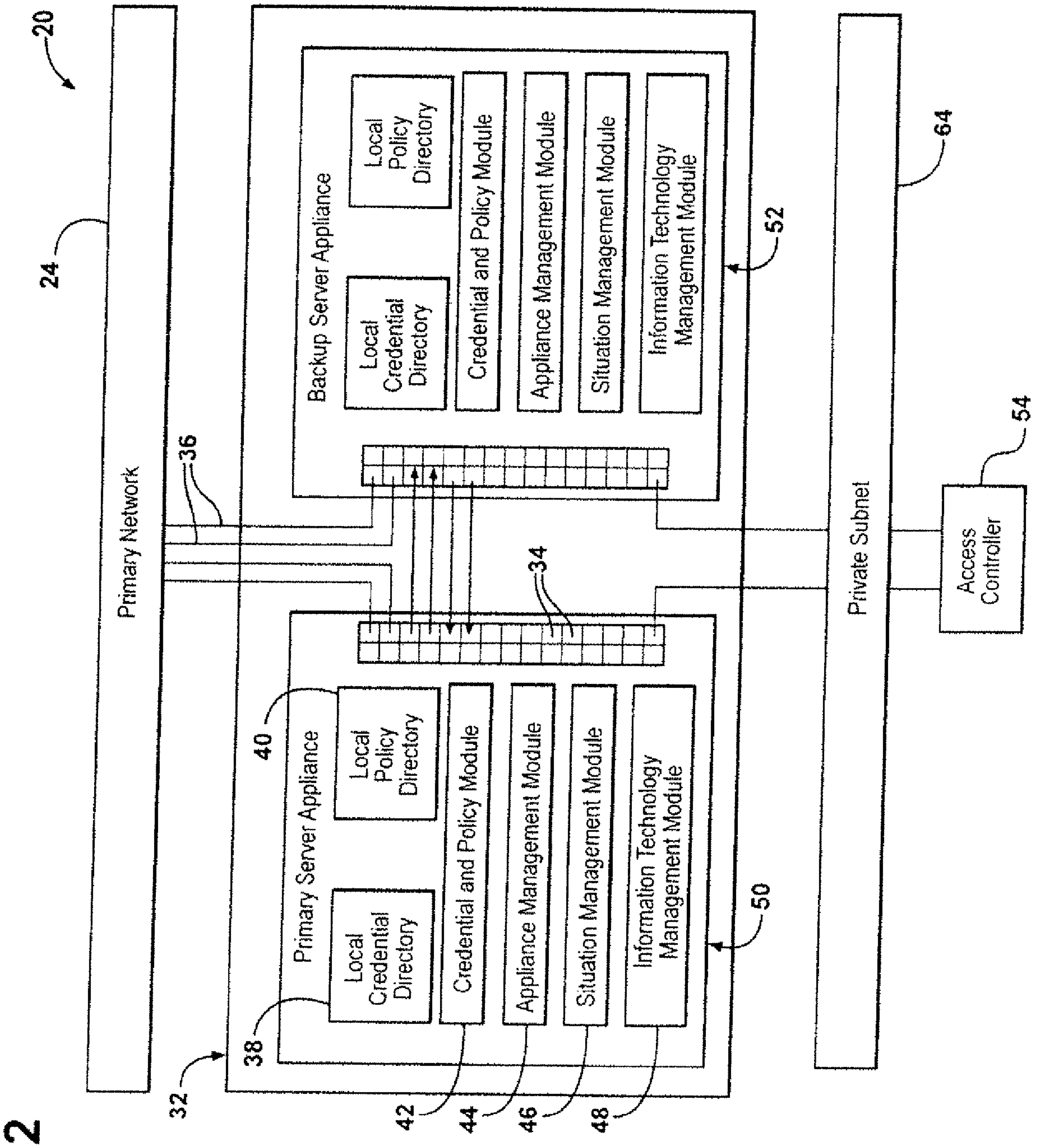
FIG. 2 is a schematic of an access server appliance including a primary server appliance and a backup server appliance.

In an embodiment of the system 20 as shown in FIG. 2, each access server appliance 32 includes a primary server appliance 50 and a backup server appliance 52. The backup server appliance 52 is configured to minor the primary server appliance 50 to provide redundancy, should one appliance cease to function. This provides increased availability in maintaining online status and reporting events to the information technology management department. The backup server appliance 52 maintains not only its local database, but a synchronized copy of the database of the primary server appliance 50. If the primary server appliance 50 should fail, the backup server appliance 52 has the information necessary to communicate with the attached security hardware.

The backup server appliance 52 will take over processing of any signals received from or transmitted to the attached security hardware. When the primary server appliance 50 has been restored to service, the primary server 50 appliance will automatically switch back to receiving and processing signals from the attached security hardware. In addition, before the primary server appliance 50 resumes control, it will replicate the local database of the backup server appliance 52.

In such an embodiment of the system 20, it is preferable to equip the primary server appliance 50 and the backup server appliance 52 with a hardware watchdog timer. The timer is programmed with a number and the primary server appliance 50 and the backup server appliance 52 each tick down the timer. The countdown preferably does not require any software to execute. By having the countdown in hardware, the system 20 eliminates any software issue from interfering with the watchdog. The primary server appliance 50 and the backup server appliance 52 must reset their respective timers to their initial values. If either timer reaches zero, a set of hardware programmed actions will occur.

At least one access controller 54 is in communication with one of the network interfaces 34 of one of the access server appliances 32; however, as many as five hundred twelve access controllers 54 may be in communication with each access server appliance 32. One skilled in the art will appreciate that the number of access controllers 54 in communication with each access server appliance 32 may exceed five hundred twelve as that number relates to the technical capabilities of the exemplary embodiment and that number does not impact or limit the novelty of the invention. Access controllers 54 preferably communicate with the access server appliances 32 using the TCP/IP networking protocol.

Each access controller 54 receives a unique IP address and subnet assignment, and the access server appliances 32 are generally configured to provide networking services such as DHCP, firewall rule sets, routing services, network access control, and intrusion detection. The information technology management module 48 of each access server appliance 32 is generally configured to control the security access device with the access controller being in communication with the security access device.

A device controller 56 is in communication with the access controller 54 for communicating access requests from the device controller 56 to the access controller 54 and for communicating access decisions from the access controller 54 to the device controller 56 to manually control the security access device 22. In an alternative embodiment of the system 20, the device controller 56 can communicate directly with the access server appliance 32 without requiring an access controller 54. In such an embodiment, the device controller 56 is in communication with one of the access server appliances 32. In an exemplary embodiment, as many as thirty-two device controllers 56 can be in communication with one of the access server appliances 32. One skilled in the art will appreciate that the number of device controllers 56 in communication with each access server appliance 32 may exceed thirty-two as that number relates to the technical capabilities of the exemplary embodiment and that number does not impact or limit the novelty of the invention. A device controller 56 preferably uses RS-485 or TCP/IP communication. In the embodiment of the invention as shown in FIG. 1, the device controller 56 is shown controlling a security access device 22 which is a door. However, those skilled in the art should appreciate the device controller 56 can also be used to control alternative security access devices 22 and that the device controller 56 is not limited to controlling a door.

A credential reader 58 is in communication with the device controller 56 for sending credentials to the device controller 56. The credential reader 58 can be, but is not limited to, a personal identification number keypad, a card reader, or a biometric device. Personnel present their credentials to the credential reader 58, and the credentials are sent to the device controller 56. The device controller 56 interprets the credentials and outputs the credentials to the access controller 54 for an access decision.

In an embodiment of the system 20, a monitor point 60 is in communication with the device controller 56 for sending the status of the security access device 22 to the device controller 56. In another embodiment of the system 20, an alarm relay 62 is in communication with the device controller 56 for sending and receiving an alarm status of the security access device 22 to the device controller 56.

Figure 3:
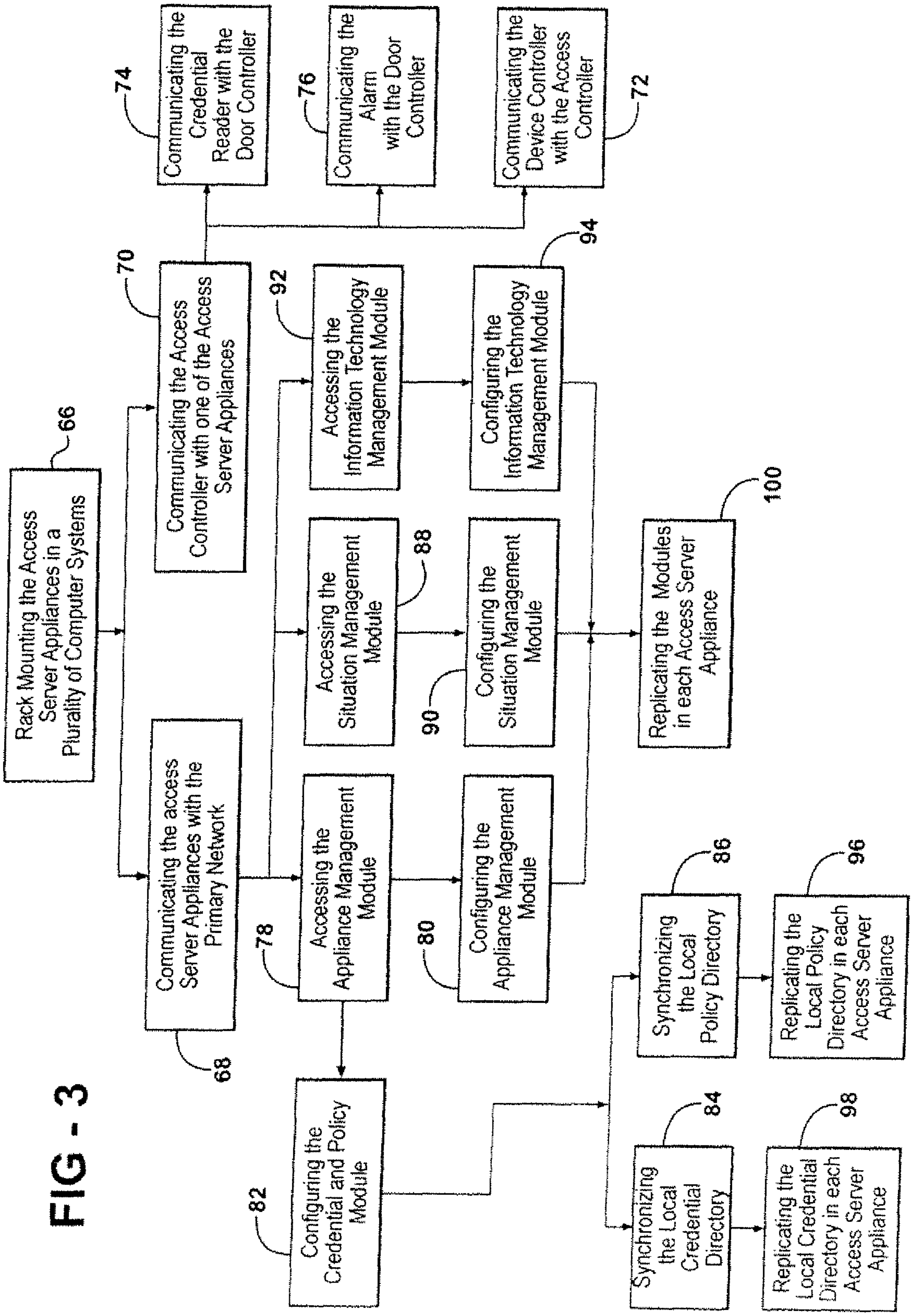
FIG. 3 is an exemplary flow chart of a method for implementing a networked physical security access control system.

A method for implementing a networked physical security access control system 20 with a security access device 22 is provided for a networked physical security access control system 20 including a plurality of access server appliances 32, an access controller 54, a device controller 56, a credential reader 58, a monitor point 60, and an alarm relay 62. An exemplary embodiment of such a method is shown in FIG. 3. The method is generally for implementing the networked physical security access control system 20 on a primary network 24 including a primary policy directory 28, a primary credential directory 26, and a user interface 30. Each access server appliance 32 includes an appliance management module 44, a situation management module 46, an information technology management module 48, a credential and policy module 42, a local credential directory 38, a local policy directory 40, and a plurality of network connections 36.

The method comprises the steps of rack mounting the plurality of access server appliances 32 into a plurality of computer systems. (66) A pair of the network connections 36 communicates each access server appliance 32 with the primary network 24. (68)

The access controller 54 is communicated with one of the access server appliances 32. (70) As the access controller 54 is plugged into the access server appliance 32, the access server appliance 32 notes the connectivity and begins processing packets received on the network interfaces 34 of the access server appliance 32. A transaction is also generated as a network interface 34 changes online status. The access server appliance 32 proceeds to check connectivity with access controllers 54, and as each access controller 54 comes online, the appropriate transactions are generated and the access server appliance 32 may begin communicating with the access controller 54 and its connected hardware.

The method also generally includes the step of communicating the device controller 56 with the access controller 54 for sending access requests to the access controller 54 and for receiving access decisions from the access controller 54 to manually control the security access device 22. (72) The device controller 56 transmits credential information and changes of state to the access controller 54. The access controller 54 receives the information, processes the information, and transmits commands back to the device controller 56 to control the operation of the input and output hardware.

The credential reader 58 is generally communicated with the device controller 56 for sending credentials to the device controller 56, and the monitor point 60 is generally communicated with the device controller 56 for sending the status of the security access device 22 to the device controller 56. (74) The alarm relay 62 is also generally communicated with the device controller 56. (76) Those skilled in the art should appreciate that additional security hardware can be used in addition to, or in place of, the above mentioned hardware. Every facility has specific requirements and will require a different set of basic security hardware.

The method further includes the step of accessing an appliance management module 44 of one of the access server appliances 32 via the user interface 30. (78) After accessing the appliance management module 44, a user configures the appliance management module 44 to a user specified security configuration. (80) The appliance management module 44 is configured for appliance networking, redundancy options, log management, remote management, status information and reporting, credential/policy hosts and event monitoring services. The appliance management module 44 also provides settings to backup the local database to other access server appliances 32 or a primary network 24 subsystem. Should an access controller 54 fail, the local credential directory 38 and the local policy directory 40 can be retrieved from the backup and restored for operation.

A user also configures the credential and policy module 42 with the appliance management module 44 to synchronize the local credential directory 38 with the primary credential directory 26 on the primary network 24 and to synchronize the local policy directory 40 with the primary policy directory 28 on the primary network 24. (82) Utilizing the user interface 30, a user configures the credential and policy module 42 of the access server appliance 32 using the appliance management module 44 to establish a connection to the primary credential directory 26 and the primary policy directory 28 on the primary network 24. When configuring the credential and policy module 42, a user may include the primary credential directory name, the primary policy directory name, and the required credentials to locate and gain access to the primary credential and policy modules 26, 28 on the primary network 24. Once the connection parameters have been programmed, the user describes to the access server appliance 32, using the appliance management module 44, which fields to import and store in the local credential directory 38 and the local policy directory 40. The user then configures the automatic synchronization from the primary credential directory 26 and the primary policy directory 28 to keep the access server appliance 32 up to date as modifications are made to the primary credential directory 26 and the primary policy directory 28. Once these parameters are stored in the access server appliance 32, the user preferably has the option of pushing them to the other access server appliances 32 on the primary network 24. Each appliance is generally responsible for its own synchronization. This eliminates a single point of failure should any one access server appliance 32 cease to function.

The policies generally include typical information technology policies such as remote access permissions, local network activation and others generally known in the art. In addition, the user may configure policies in the access server appliance 32 to notify the information technology infrastructure of access events. The infrastructure may include single sign-on servers, usage requirements or locale information. Also, the appliance management module 44 provides the user the ability to manage and assign roles for access control purposes. The user assigns each set of security access devices 22 a specific role which is allowed to access the set of security access devices 22 at a specified time. Each credential may be assigned any number of roles which implicitly link accessible security access devices 22 and policies as may be assigned to the role. Other decision attributes may also be programmed depending on the various requirements of the facility. Policies not assigned may be programmed to enforce various rules, schedules and conditions required for access to be granted. Also, the appliance management module 44 provides the ability to review individual credentials and run reports.

The local credential directory 38 of the access server appliance 32 synchronizes with the primary credential directory 26 on the primary network 24, (84) and the local policy directory 40 of the access server appliances 32 synchronizes with the primary policy directory 28 on the primary network 24 in response to the configuration of the credential and policy module 42 of the access server appliance 32. (86) The local credential directory 38 and the local policy directory 40 preferably communicate with the primary credential directory 26 and the primary policy directory 28 respectively on the primary network 24 using a variety of protocols dependent on the type of directories. The access server appliance 32 preferably supports LDAP (Lightweight Directory Access Protocol), MICROSOFT® and ORACLE® directory access methods, however, those skilled in the art appreciate that the access server appliance 32 supports all databases known in the art. Using LDAP, the access server appliance 32 supports the following directories: MICROSOFT® Active Directory; MICROSOFT® Active Directory Application Mode (ADAM); OpenLDAP; IBM® Tivioli Directory, CA eSecure directory, ORACLE® Virtual Directory; and NOVELL® eDirectory.

The method includes the steps of accessing a situation management module 46 of one of the access server appliances 32 with the user interface 30, (88) and configuring the situation management module 46 to allow third party physical security situation management systems to control the security access equipment. (90) The situation management module 46 provides a comprehensive set of web services allowing third party physical security situation management (PSIM) systems to command and control any of the access control equipment 62 attached to any access server appliance 32. The web services provide the following methods to support the PSIM mission: connect to the access server appliance 32 using mutually agreed upon authentication;

transmit events to the PSIM based on the authorization of the user including any event filters and data restrictions; receive commands from the PSIM to control access control hardware; adjust credential access privileges and monitor muster areas, guard tours, or card traces. The PSIM may connect to any access server appliance 32 and have visibility into the entire system 20. It need not connect to each access server appliance 32 or track which access server appliance 32 contains which access control hardware. The PSIM provides the overall situational awareness view while aggregating information from a variety of sources including the access server appliances 32.

The method also includes the steps of accessing an information technology management module 48 of one of the access server appliances 32 via the user interface 30, (92) and configuring the information technology management module 48 with parameters for monitoring the access server appliances 32 and the system 20. (94) The information technology management module 48 maintains all parameters required to allow each access server appliance 32 to be remotely monitored and updated using an industry standard SNMP software package such as, but not limited to, HP, OpenView, IBM Tivoli, or Microsoft Systems Center. The information technology management module 48 may be configured to send all transactions to the information technology reporting system 20 and to include all access server appliance 32 notifications as well as all access control activity. This integrated reporting provides a complete picture of all logical and physical access activity of an enterprise. The information technology management module 48 ties the access server appliances 32 directly to the network fabric allowing information technology professionals to manage the system 20 as any other network device without requiring extensive training or appliance specific specialized skills The system 20 provides an extensive enhanced set of capabilities to a standard commercial off the shelf IT management application using SNMP. The system 20 includes a Management Information Base (MIB) to be used with any SNMP management console. Some of these capabilities include monitoring each access server appliance 32 status including memory and disk usage, CPU load, network activity and other network statistics. Using the MIB, the user has the ability to set various parameters from the SNMP management console without necessarily using the web based application described earlier. Also, the system 20 has the ability to transmit events such as appliance events, access control activity, and network activity directly to an information technology management system 20 using industry standard logging capabilities.

The method also includes the step of configuring the information technology management module 48 of one of the access server appliances 32 to maintain event and transaction logs. (94) As events are generated, the access controller 54 uploads these events to the access server appliance 32. In an embodiment of the system 20, the user configures the access server appliance 32 to store events locally if unable to upload event information to the information technology system 20. In another embodiment of the system 20, the access server appliance 32 automatically stores event information locally on permanent storage and also uploads them to the information technology system 20. If stored in the access server appliance 32, the access server appliance 32 also forwards the events to the other access server appliances 32 for redundancy and increased search performance.

As commands are received from the security access devices 22 or as the access server appliance 32 deems necessary, commands are sent from the access server appliance 32 to the access controller 54 to update its local database of credentials, access policies, and reference information to allow it to perform access control decision making locally without any assistance from the access server appliance 32. These commands may generate additional transactions which will be reported back to the access server appliance 32.

The method also includes the step of configuring the information technology management module 48 of one of the access server appliances 32 for establishing a private subnet 64. (94) The information technology management module 48 is generally configured to provide networking services such as DHCP, firewall rule sets, routing services, network access control, and intrusion detection. The method also includes the step of placing one of the access controllers 54 on the private subnet 64 to provide routing services and firewall protection. Each access controller 54 generally receives a unique IP address and subnet assignment.

The information technology management module 48 is configured to determine the signals transmitted between the primary network 24 and the private subnet 64. (94) The information technology management module 48 applies inbound traffic firewall restrictions on the private subnet 64 interface, as all communication initiates from the access server appliance 32 with no incoming traffic from the access controllers 54. The operator has the option to re-configure the firewall if non-access control devices reside on the private subnet 64. The access server appliance 32 has several safeguards to prevent unauthorized network devices from obtaining a DHCIP address or being able to use a static IP address and communicate with the access controllers 54. The access server appliance 32 supports the use of VLANS to segregate traffic and communicate only with access controllers 54 approved by the primary network 24. The information technology management module 48 can also filter which MAC addresses are assigned dynamic addresses. The information technology management module 48 may be configured to deny addresses to unknown devices or any device put in a "do not assign" list. As devices are assigned addresses, a transaction is generated indicating which access controller 54 asked for address, date/time, and which access server appliance 32 serviced the request.

The method further includes the step of configuring the information technology management module 48 with parameters for controlling the device controller 56 with the access controller 54. (94) The information technology management module 48 maintains all parameters necessary to manage all doors, input points and output points. This includes access and device controller 54, 56 setup, door operation programming, interlocking input/output programming, firmware upgrades and the ability to manually manipulate all configured hardware. The user also defines schedules for sending updates to each of its assigned access controllers 54. Also, the information technology management module 48 provides a real time status screen indicating status of all doors, input points, output points, access controllers 54 and device controllers 56

The method also includes the steps of replicating the local policy directory 40 of an accessed access server appliance 32 in each of the other access server appliances 32 through peer-to-peer communication on the primary network 24 to maintain consistency in the access server appliances 32 in response to synchronizing the local policy directory 40 of the accessed access server appliance 32 with the primary policy directory 28. (96) The method also includes the step of replicating the local credential directory 38 of an accessed access server appliance 32 in each of the other access server appliances 32 through peer-to-peer communication on the primary network 24 to maintain consistency in the access server appliances 32 in response to synchronizing the local credential directory 38 of the accessed access server appliance 32 with the primary credential directory 26. (98)

The method also includes the step of replicating the appliance management module 44, the credential and policy module 42, the situation management module 46, and the information technology management module 48 of the accessed access server appliance 32 in each of the other access server appliances 32 through peer-to-peer communication on the primary network 24 to maintain consistency in the access server appliances 32 after one of the modules 42, 44, 46, 48 is configured. (100) In an embodiment of the system 20, all of the modules 42, 44, 46, 48 of the accessed access server appliance 32 are replicated in the rest of the access server appliances 32 after a module is configured. In an alternative embodiment, only the module that is configured is replicated in the other access server appliances 32.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

I claim:

1. A networked physical security access control system for controlling a security access device comprising:

a primary network including a user interface;

a plurality of access server appliances in communication with the primary network, the access server appliances being in peer-to-peer communication on the primary network to bridge the access server appliances for providing consistency in each of the access server appliances;

an access server appliance of the plurality of access server appliances comprising an appliance management module that configures the access server appliance to a specified security configuration; and the specified security configuration is replicated using the primary network in additional ones of the plurality of access server appliances.

2. The system of claim 1, wherein each access server appliance includes a local credential directory for storing access control information and a local policy directory for storing security access policies.

3. The system of claim 2, wherein the local credential directory and the local policy directory are lightweight directory access protocol directories.

4. The system of claim 2, wherein each access server appliance includes a credential and policy module for synchronizing the local credential directory with local credential directories of others of the plurality of access server appliances

5. The system of claim 4 wherein policies include login permission and group enrollment/de-enrollment, wherein the appliance management module configures the access server appliance to manage the credential and policy module.

6. The system of claim 5, wherein each access server appliance includes an information technology management module for configuring the access controller to control the security access device.

7. The system of claim 5, wherein each access server appliance includes a situation management module for configuring a third party physical security situation management system to control the access controller.

8. The system of claim 1 including an access controller in communication with one of the access server appliances.

9. The system of claim 1, wherein each access server appliance includes an information technology management module for monitoring the access server appliances and the system.

10. The system of claim 1, further comprising a backup server appliance that backs up each of the access server appliances, the backup server appliance being a mirror of each of the primary server appliances for providing redundancy.

11. The system of claim 1, further comprising a backup server appliance that backs up a subset of the access server appliances, the backup server appliance being a mirror of each of the access server appliances in the subset for providing redundancy.

* * * * *